(12) United States Patent
Merlin

(10) Patent No.: US 11,700,152 B2
(45) Date of Patent: Jul. 11, 2023

(54) SOUNDING FOR RADIO-FREQUENCY (RF) SENSING

(71) Applicant: QUALCOMM Incorporated, San Diego, CA (US)

(72) Inventor: Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 17/166,897

(22) Filed: Feb. 3, 2021

(65) Prior Publication Data

US 2021/0250205 A1 Aug. 12, 2021

Related U.S. Application Data

(60) Provisional application No. 62/970,857, filed on Feb. 6, 2020.

(51) Int. Cl.
*H04L 25/02* (2006.01)
*H04W 24/10* (2009.01)
*H04B 17/318* (2015.01)

(52) U.S. Cl.
CPC ....... *H04L 25/0224* (2013.01); *H04B 17/318* (2015.01); *H04W 24/10* (2013.01)

(58) Field of Classification Search
CPC ... H04L 25/0224; H04W 24/10; H04B 17/318
See application file for complete search history.

(56) References Cited

U.S. PATENT DOCUMENTS

| 9,985,708 | B2 | 5/2018 | Shapira et al. | |
| 10,986,522 | B2* | 4/2021 | Li | H04L 5/0032 |
| 2009/0196190 | A1* | 8/2009 | Li | H04L 5/0046 |
| | | | | 370/252 |
| 2010/0298000 | A1* | 11/2010 | Li | H04W 4/029 |
| | | | | 455/440 |
| 2012/0176921 | A1* | 7/2012 | Abraham | H04L 25/0226 |
| | | | | 370/252 |
| 2012/0177018 | A1* | 7/2012 | Abraham | H04L 1/0027 |
| | | | | 370/328 |

(Continued)

OTHER PUBLICATIONS

International Search Report and Written Opinion—PCT/US2021/016547—ISA/EPO—dated May 12, 2021.

*Primary Examiner* — Zhiren Qin
(74) *Attorney, Agent, or Firm* — Holland & Hart LLP

(57) ABSTRACT

This disclosure provides methods, devices and systems for radio frequency (RF) sensing in wireless communication systems. In some implementations, a transmitting device may transmit a sounding dataset, over a wireless channel, to a receiving device. The sounding dataset may include information carried in one or more training fields configured for channel estimation and sounding control information based, at least in part, on a configuration of the transmitting device. The receiving device may acquire channel state information (CSI) for the wireless channel based on the received sounding dataset and selectively generate a channel report for the wireless channel based, at least in part, on the CSI and the sounding control information. The channel report may indicate changes to the wireless channel which, in turn, may be used to sense objects in the vicinity of the transmitting device or the receiving device.

30 Claims, 14 Drawing Sheets

(56) References Cited

U.S. PATENT DOCUMENTS

| | | | |
|---|---|---|---|
| 2013/0315120 A1* | 11/2013 | Yu | H04L 1/0036 |
| | | | 370/311 |
| 2013/0342402 A1* | 12/2013 | Pesonen | G01S 5/0295 |
| | | | 342/451 |
| 2015/0257090 A1* | 9/2015 | Chen | H04B 7/0871 |
| | | | 455/552.1 |
| 2015/0327217 A1* | 11/2015 | Aboul-Magd | H04W 72/121 |
| | | | 370/329 |
| 2016/0127019 A1 | 5/2016 | Schelstraete et al. | |
| 2019/0007854 A1* | 1/2019 | Chen | H04L 5/0091 |
| 2019/0132724 A1* | 5/2019 | Asterjadhi | H04W 48/10 |
| 2020/0092073 A1* | 3/2020 | Papasakellariou | H04L 5/0092 |
| 2020/0228297 A1* | 7/2020 | Zhang | H04L 1/00 |
| 2020/0236576 A1* | 7/2020 | Chen | H04L 5/0048 |

* cited by examiner

SOUNDING FOR RADIO-FREQUENCY (RF) SENSING

CROSS-REFERENCE TO RELATED APPLICATIONS

This Patent Application claims priority to U.S. Provisional Patent Application No. 62/970,857 entitled "SOUNDING FOR RADIO-FREQUENCY (RF) SENSING" and filed on Feb. 6, 2020, which is assigned to the assignee hereof. The disclosure of the prior Application is considered part of and are incorporated by reference in this Patent Application.

TECHNICAL FIELD

This disclosure relates generally to wireless communication, and more specifically, to sounding techniques for RF sensing in wireless communication systems.

DESCRIPTION OF THE RELATED TECHNOLOGY

Wireless communication devices communicate by transmitting and receiving electromagnetic signals in the radio frequency (RF) spectrum. The operating environment of the wireless communication devices affects the propagation of the electromagnetic signals. For example, electromagnetic signals transmitted by a transmitting device may reflect off objects and surfaces in the environment before reaching a receiving device located a distance away. Accordingly, the amplitudes or phases of the electromagnetic signals received by the receiving device may depend, at least in part, on the characteristics of the environment.

RF sensing is a technique for sensing objects or movement in an environment based, at least in part, on the transmission and reception of electromagnetic signals. More specifically, changes in the environment can be detected based on changes in the electromagnetic signals (such as phase or amplitude) propagating through the environment. For example, a person moving through the environment interferes with the electromagnetic signals that are transmitted by a transmitting device. A receiving device may detect and characterize such changes to its received signals to determine the speed or direction of the person's movement.

The range of applications or accuracy of RF sensing may depend on the amount or detail of information communicated between the transmitting device and the receiving device. Accordingly, a mechanism is needed to facilitate the exchange of information between the transmitting device and the receiving device when performing RF sensing.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving a sounding dataset, over a wireless channel, from a transmitting device, where the sounding dataset includes information carried in one or more training fields configured for channel estimation and sounding control information indicating a configuration of the transmitting device; acquiring channel state information (CSI) for the wireless channel based on the received sounding dataset; and selectively transmitting a channel report to the transmitting device based at least in part on the CSI and the sounding control information.

In some implementations, the sounding control information may include a sequence number indicating the configuration of the transmitting device. In some implementations, the sounding control information may include timing information or information indicating one or more transmission parameters associated with a transmission of the sounding dataset by the transmitting device. In some implementations, the channel report may include a subset of the sounding control information.

In some implementations, the channel report may include a sequence number indicating a configuration of the wireless communication device. In some implementations, the channel report may include timing information or information indicating one or more reception parameters associated with the reception of the sounding dataset. In some implementations, the selective transmitting of a channel report may include obtaining an indication that a received signal strength indication (RSSI) associated with the sounding dataset is below an RSSI threshold, where no channel report is transmitted to the transmitting device based on the indication that the RSSI is below the RSSI threshold.

In some implementations, the method may further include acquiring CSI for a reference channel; and obtaining an indication of a difference between the CSI for the wireless channel and the CSI for the reference channel. In some implementations, the channel report may include the indication of the difference in CSI. In some implementations, the selective transmitting of a channel report may include comparing the difference in CSI to a CSI difference threshold, where no channel report is transmitted to the transmitting device based on the difference in CSI being below the CSI difference threshold.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a sounding dataset, over a wireless channel, from a transmitting device, the sounding dataset including information carried in one or more training fields configured for channel estimation and sounding control information indicating a configuration of the transmitting device; acquiring CSI for the wireless channel based on the received sounding dataset; and selectively transmitting a channel report to the transmitting device based at least in part on the CSI and the sounding control information.

Another innovative aspect of the subject matter described in this disclosure can be implemented as a method of wireless communication. The method may be performed by a wireless communication device, and may include generating sounding control information based, at least in part, on a configuration of the wireless communication device; and transmitting a sounding dataset, over a wireless channel, to a receiving device, where the sounding dataset includes the sounding control information and information carried in one or more training fields configured for channel estimation.

In some implementations, the sounding control information may include a sequence number indicating the configuration of the wireless communication device. In some implementations, the sounding control information may include timing information or one or more transmission parameters associated with the transmission of the sounding dataset.

In some implementations, the method may further include receiving a channel report from the receiving device responsive to the transmission of the sounding dataset, where the channel report includes CSI for the wireless channel; and sensing objects in a vicinity of the wireless communication device based on the received channel report. In some implementations, the channel report may include a subset of the sounding control information. In some implementations, the channel report may include a sequence number indicating a configuration of the receiving device. In some implementations, the channel report may include timing information or information indicating one or more reception parameters associated with a reception of the sounding dataset by the receiving device.

In some implementations, the channel report may indicate a difference in CSI between the wireless channel and a reference channel. In some implementations, the sounding control information may identify the reference channel. In some other implementations, the sounding control information may identify the wireless channel as a reference channel for future channel reports.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including generating sounding control information based, at least in part, on a configuration of the wireless communication device; and transmitting a sounding dataset, over a wireless channel, to a receiving device, where the sounding dataset includes the sounding control information and information carried in one or more training fields configured for channel estimation.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
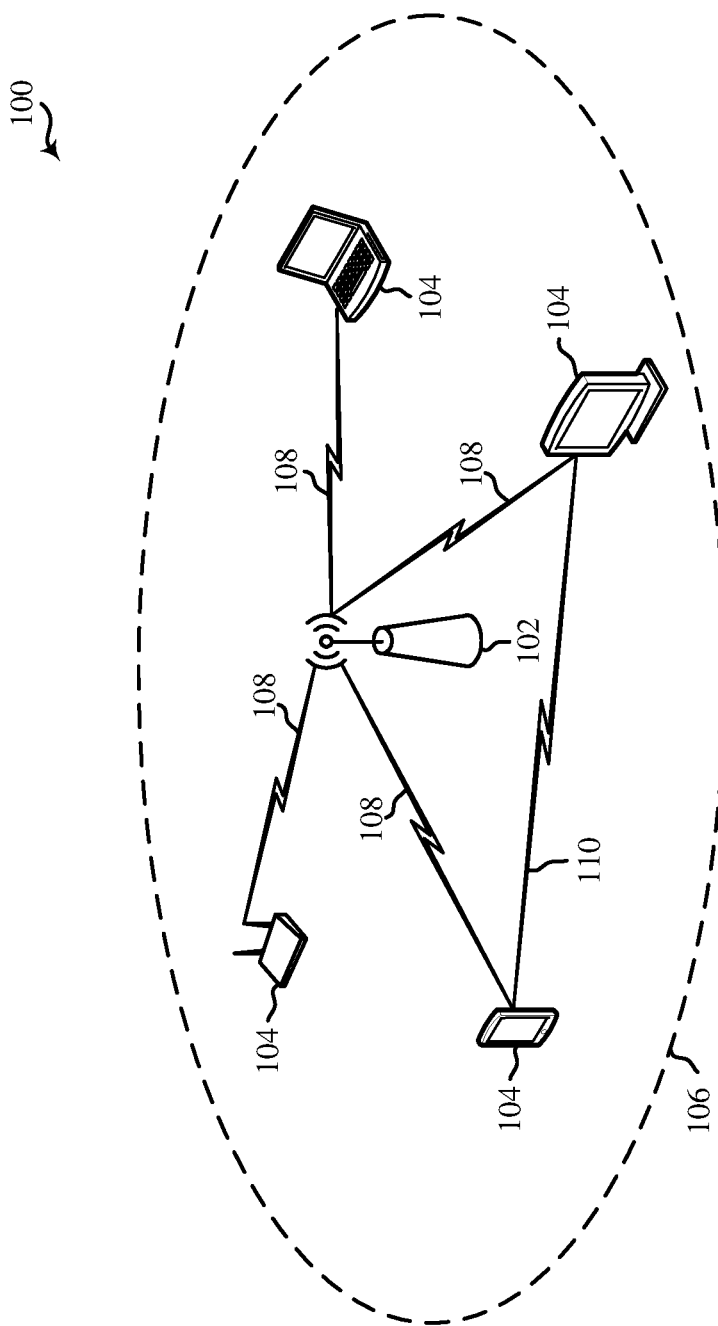
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to RF sensing in wireless communication systems. Some implementations more specifically relate to using signaling techniques and packet formats conforming to the IEEE 802.11 family of standards for performing RF sensing by one or more communication devices. A WLAN may be formed by one or more access points (APs) that provide a shared wireless communication medium for use by a number of client devices also referred to as stations (STAs). The basic building block of a WLAN conforming to the IEEE 802.11 family of standards is a Basic Service Set (BSS), which is managed by an AP. Each BSS is identified by a Basic Service Set Identifier (BSSID) that is advertised by the AP. Wireless communication devices (such as APs and STAs) communicate by transmitting and receiving electromagnetic signals in the RF spectrum. Electromagnetic signals transmitted by a transmitting device may reflect off objects and surfaces along the transmission path before reaching a receiving device located a distance away. The electromagnetic signals also may carry information and data that can be used by the receiving device to measure the wireless channel. Accordingly, signaling techniques conforming to the IEEE 802.11 family of standards may be well-suited for RF sensing.

In some implementations, a wireless communication network conforming to the IEEE 802.11 family of standards (such as a WLAN) may be used to implement an RF sensing system. A transmitting device may transmit a sounding dataset, over a wireless channel, to a receiving device. The sounding dataset may include information carried in one or more training fields configured for channel estimation and sounding control information based, at least in part, on a configuration of the transmitting device. The receiving device may acquire channel state information (CSI) for the wireless channel based on the received sounding dataset and selectively generate a channel report for the wireless channel based, at least in part, on the CSI and the sounding control information. The channel report may indicate changes to the wireless channel which, in turn, may be used to sense objects in the vicinity of the transmitting device or the receiving device.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P)

networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
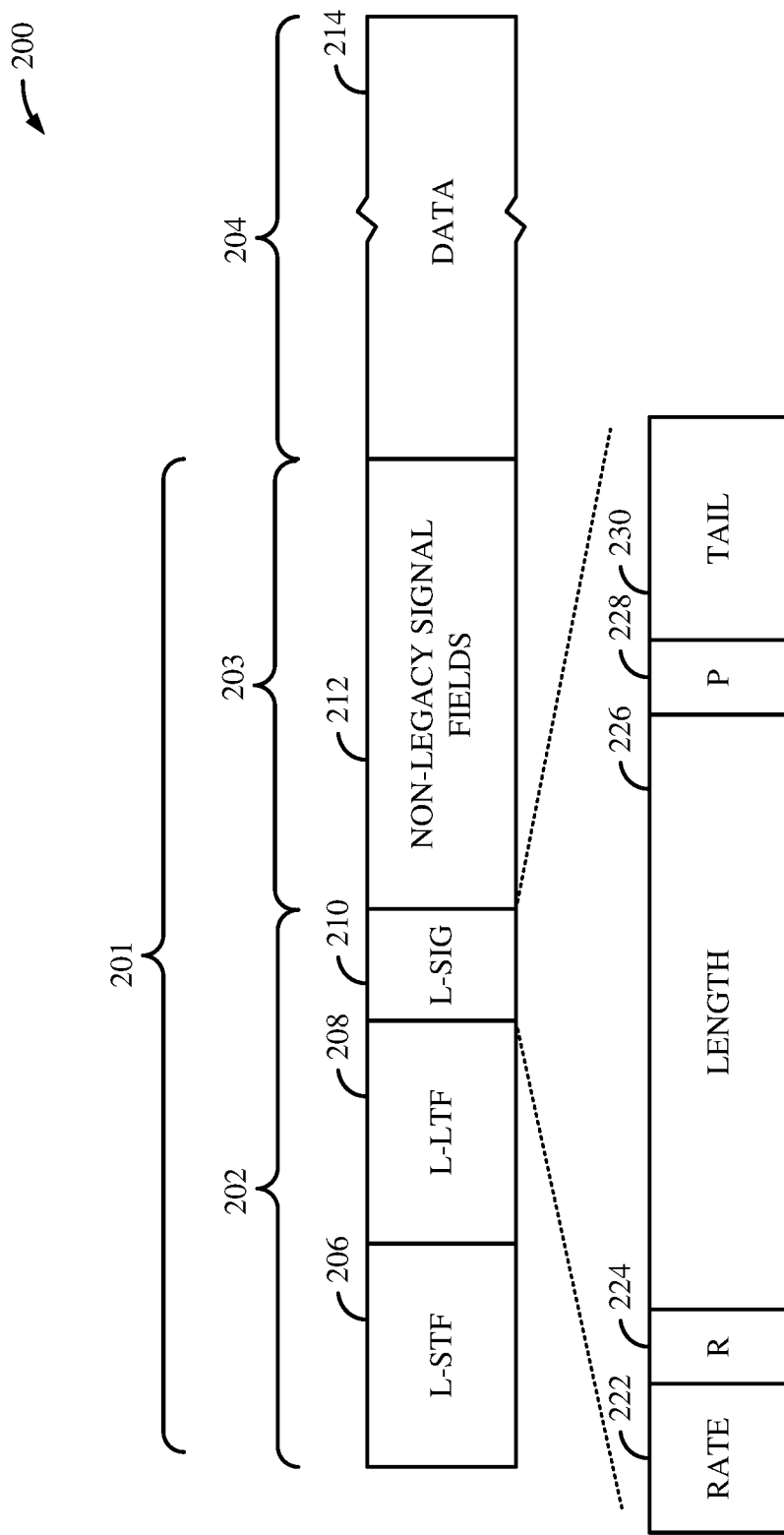
FIG. 2 shows an example protocol data unit (PDU) usable for communications between an access point (AP) and each of a number of stations (STAs).

FIG. 2 shows an example protocol data unit (PDU) 200 usable for wireless communication between an AP and a number of STAs. For example, the PDU 200 can be configured as a PPDU. As shown, the PDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard. The preamble 201 may also include a second portion 203 including one or more non-legacy signal fields 212, for example, conforming to an IEEE wireless communication protocol such as the IEEE 802.11ac, 802.11ax, 802.11be or later wireless communication protocol standards.

L-STF 206 generally enables a receiving device to perform automatic gain control (AGC) and coarse timing and frequency estimation. L-LTF 208 generally enables a receiving device to perform fine timing and frequency estimation and also to perform an initial estimate of the wireless channel. L-SIG 210 generally enables a receiving device to determine a duration of the PDU and to use the determined duration to avoid transmitting on top of the PDU. For example, L-STF 206, L-LTF 208 and L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2 also shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
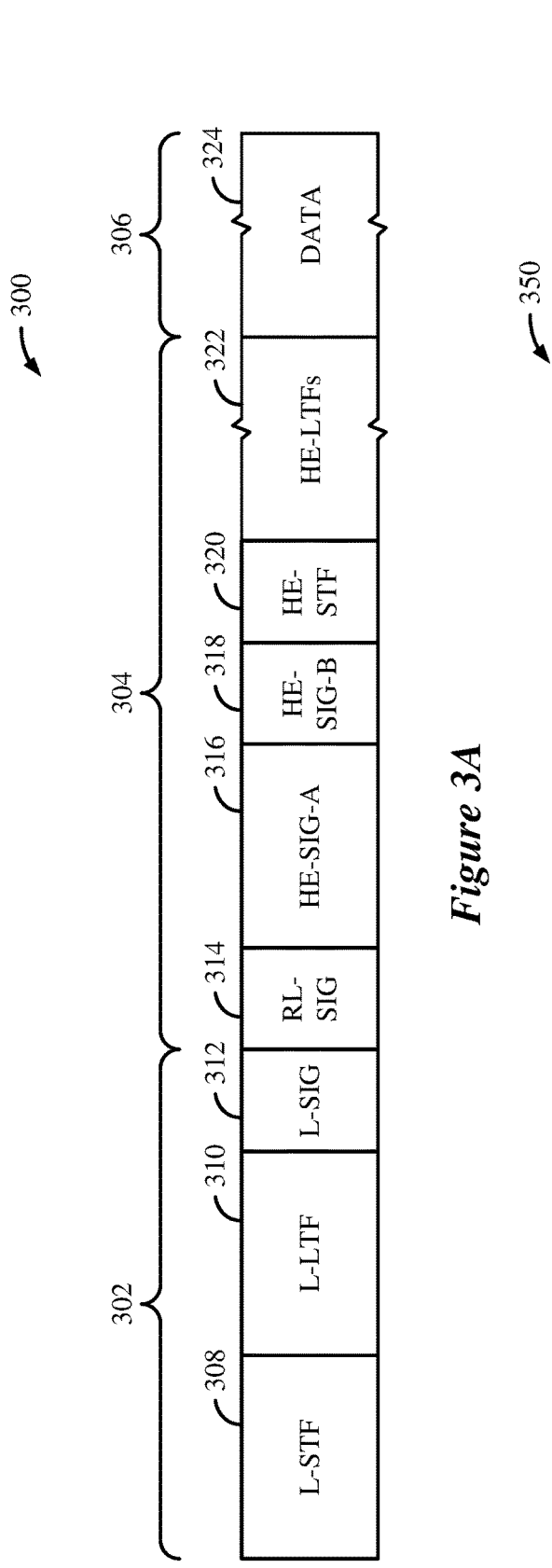
FIG. 3A shows an example PDU usable for communications between an AP and each of a number of STAs.

FIG. 3A shows another example PDU 300 usable for wireless communication between an AP and a number of STAs. The PDU 300 includes a PHY preamble including a first portion 302 and a second portion 304. The PDU 300 may further include a PHY payload 306 after the preamble, for example, in the form of a PSDU including a DATA field 322. The first portion 302 of the preamble includes L-STF 308, L-LTF 310, and L-SIG 312. The second portion 304 of the preamble and the DATA field 322 may be formatted as a Very High Throughput (VHT) preamble and frame, respectively, in accordance with the IEEE 802.11ac amendment to the IEEE 802.11 wireless communication protocol standard. The second portion 304 includes a first VHT signal field (VHT-SIG-A) 314, a VHT short training field (VHT-STF) 316, a number of VHT long training fields (VHT-LTFs) 318, and a second VHT signal field (VHT-SIG-B) 320 encoded separately from VHT-SIG-A 314. Like L-STF 308, L-LTF 310, and L-SIG 312, the information in VHT-SIG-A 314 may be duplicated and transmitted in each of the component 20 MHz subchannels in instances involving the use of a bonded channel.

VHT-STF 316 may be used to improve automatic gain control estimation in a MIMO transmission. VHT-LTFs 318 may be used for MIMO channel estimation and pilot subcarrier tracking. The preamble may include one VHT-LTF 318 for each spatial stream the preamble is transmitted on. VHT-SIG-A 314 may indicate to VHT-compatible APs 102 and STAs 104 that the PPDU is a VHT PPDU. VHT-SIG-A 314 includes signaling information and other information usable by STAs 104 to decode VHT-SIG-B 320. VHT-SIG-A 314 may indicate a bandwidth (BW) of the packet, the presence of space-time block coding (STBC), the number $N_{STS}$ of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail. VHT-SIG-B 320 may be used for MU transmissions and may contain the actual data rate and MPDU or A-MPDU length values for each of the multiple STAs 104, as well as signaling information usable by the STAs 104 to decode data received in the DATA field 322, including, for example, an MCS and beamforming information.

Figure 3B:
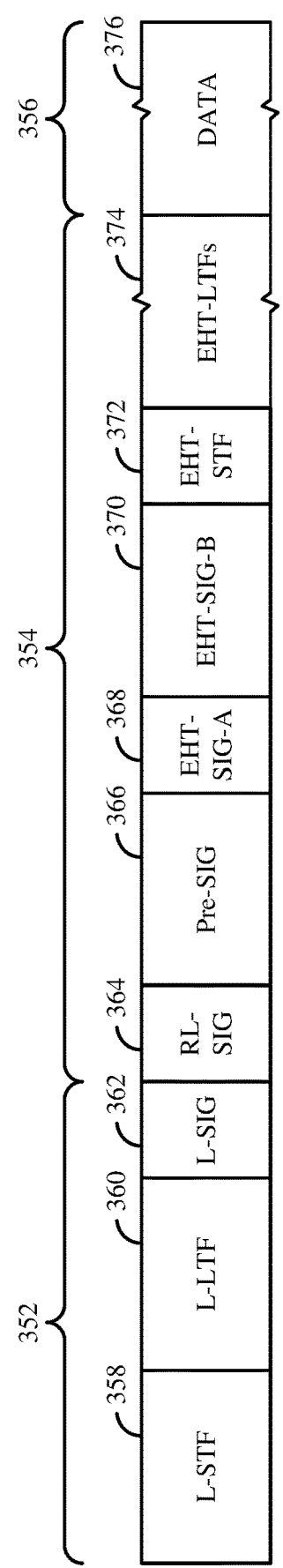
FIG. 3B shows another example PDU usable for communications between an AP and each of a number of STAs.

FIG. 3B shows another example PDU 350 usable for wireless communication between an AP and a number of STAs. The PDU 350 may be used for MU-OFDMA or MU-MIMO transmissions. The PDU 350 includes a PHY preamble including a first portion 352 and a second portion 354. The PDU 350 may further include a PHY payload 356 after the preamble, for example, in the form of a PSDU including a DATA field 374. The first portion 352 includes L-STF 358, L-LTF 360, and L-SIG 362. The second portion 354 of the preamble and the DATA field 374 may be formatted as a High Efficiency (HE) WLAN preamble and frame, respectively, in accordance with the IEEE 802.11ax amendment to the IEEE 802.11 wireless communication protocol standard. The second portion 354 includes a repeated legacy signal field (RL-SIG) 364, a first HE signal field (HE-SIG-A) 366, a second HE signal field (HE-SIG-B) 368 encoded separately from HE-SIG-A 366, an HE short training field (HE-STF) 370 and a number of HE long training fields (HE-LTFs) 372. Like L-STF 358, L-LTF 360, and L-SIG 362, the information in RL-SIG 364 and HE-SIG-A 366 may be duplicated and transmitted in each of the component 20 MHz subchannels in instances involving the use of a bonded channel. In contrast, HE-SIG-B 368 may be unique to each 20 MHz subchannel and may target specific STAs 104.

RL-SIG 364 may indicate to HE-compatible STAs 104 that the PPDU is an HE PPDU. An AP 102 may use HE-SIG-A 366 to identify and inform multiple STAs 104 that the AP has scheduled UL or DL resources for them. HE-SIG-A 366 may be decoded by each HE-compatible STA 104 served by the AP 102. HE-SIG-A 366 includes information usable by each identified STA 104 to decode an associated HE-SIG-B 368. For example, HE-SIG-A 366 may indicate the frame format, including locations and lengths of HE-SIG-Bs 368, available channel bandwidths, and modulation and coding schemes (MCSs), among other possibilities. HE-SIG-A 366 also may include HE WLAN signaling information usable by STAs 104 other than the number of identified STAs 104.

HE-SIG-B 368 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 368 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 374.

Figure 4:
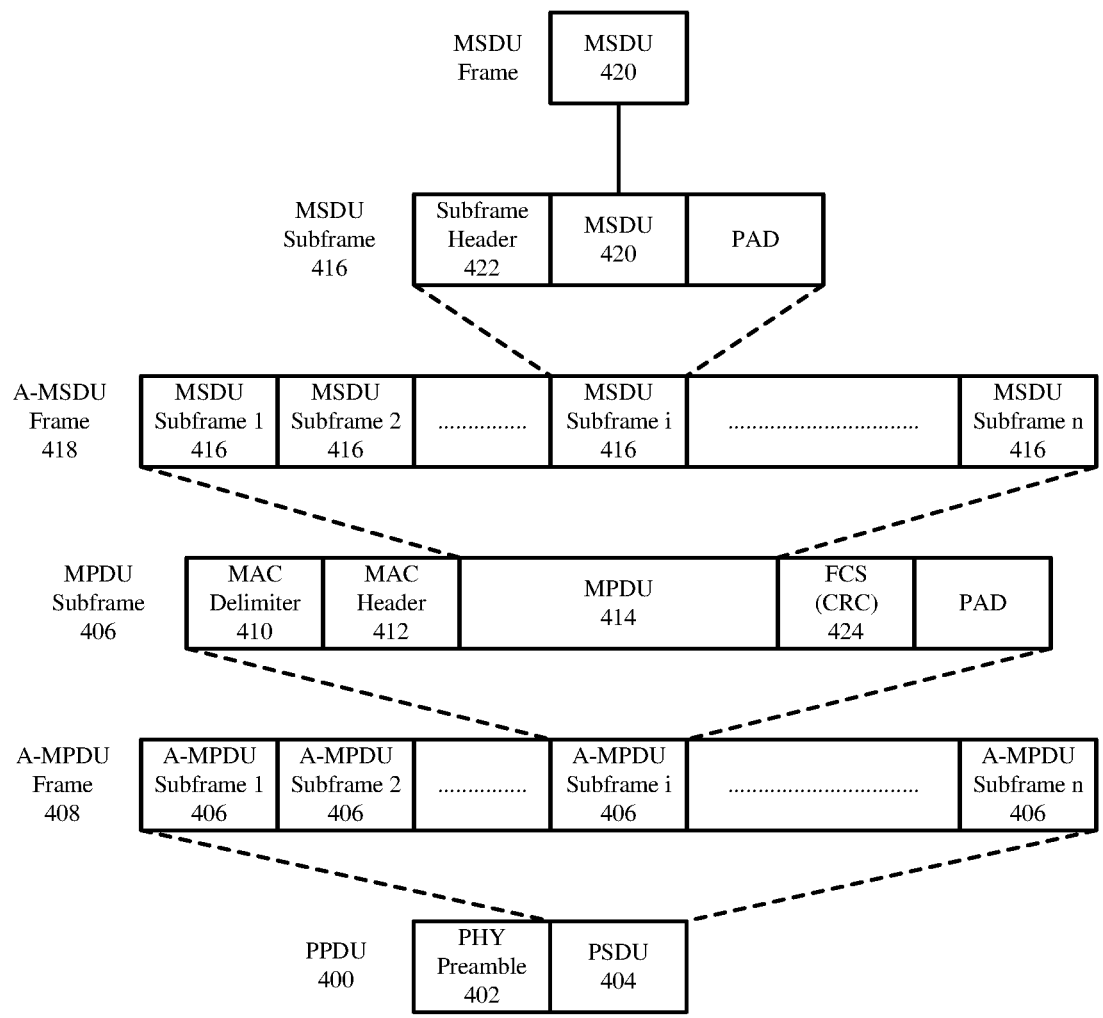
FIG. 4 shows an example physical layer convergence protocol (PLCP) protocol data unit (PPDU) usable for communications between an AP and each of a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which comprises the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 may also include a frame check sequence (FCS) field 424 for error detection. For example, the FCS field 416 may include a cyclic redundancy check (CRC).

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas. APs and STAs that include multiple antennas may also support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described below). The $N_{SS}$ spatial streams may be mapped to a number $N_{STS}$ of space-time streams, which are then mapped to $N_{Tx}$ transmit chains.

APs and STAs that include multiple antennas may also support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number $N_{SS}$ of spatial streams that the transmitting device can simultaneously transmit to the receiving device is limited by the lesser of $N_{Tx}$ and $N_{Rx}$. In some implementations, the AP 102 and STAs 104 may be able to implement both transmit diversity as well as spatial multiplexing. For example, in instances in which the number $N_{SS}$ of spatial streams is less than the number $N_{Tx}$ of transmit antennas, the spatial streams may be multiplied by a spatial expansion matrix to achieve transmit diversity.

APs and STAs that include multiple antennas may also support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may then perform measurements for each of the $N_{Tx} \times N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may then generate a precoding (or "steering") matrix for the beamformee based on the feedback and use the steering matrix to precode the data streams to configure the amplitudes and phase shifts for subsequent transmissions to the beamformee.

As described above, a transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions by increasing the number of transmit antennas. This is especially advantageous in MU transmission contexts in which it is particularly important to reduce inter-user interference.

Figure 5:
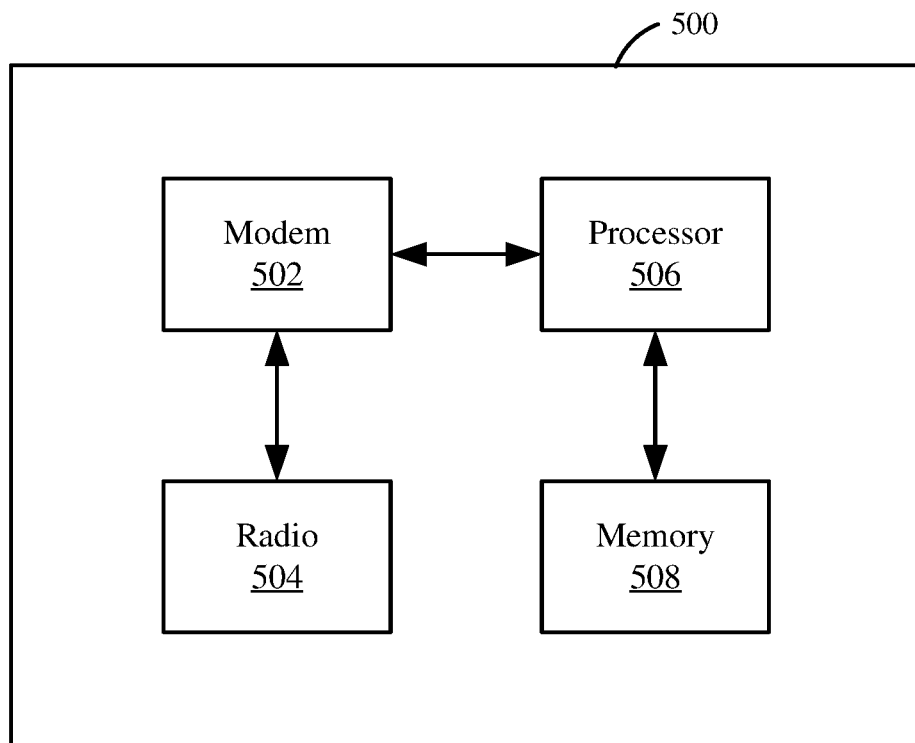
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
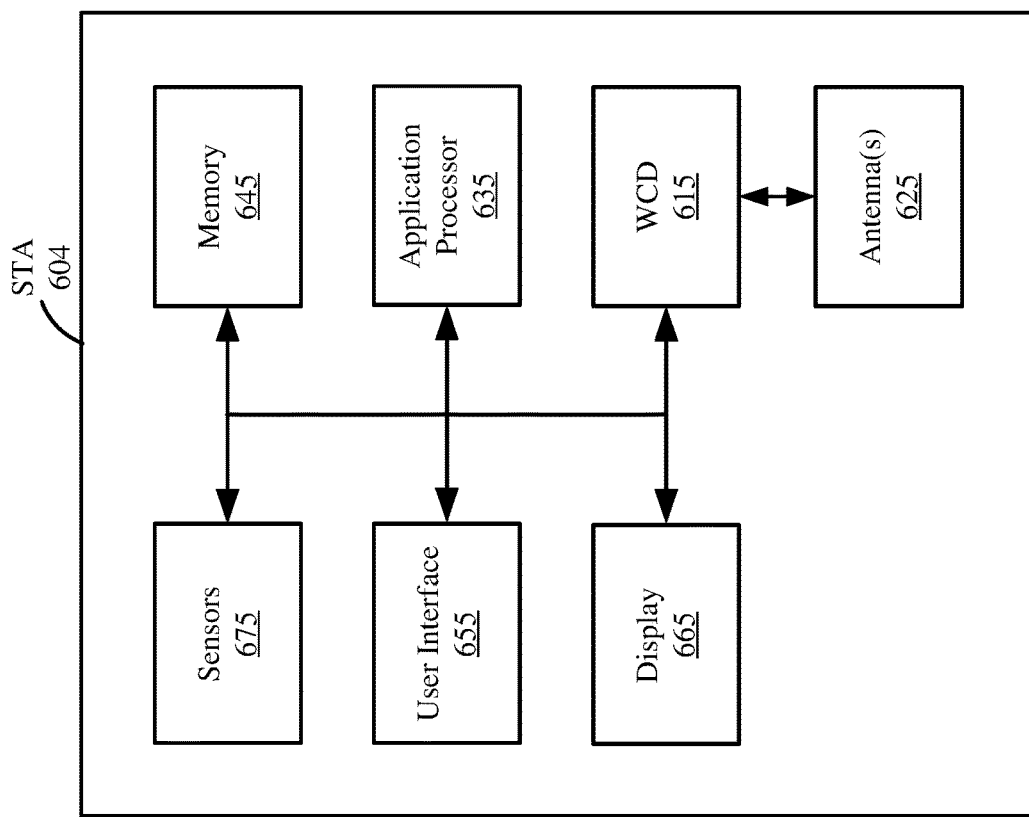
FIG. 6B shows a block diagram of an example STA.
Figure 6A:
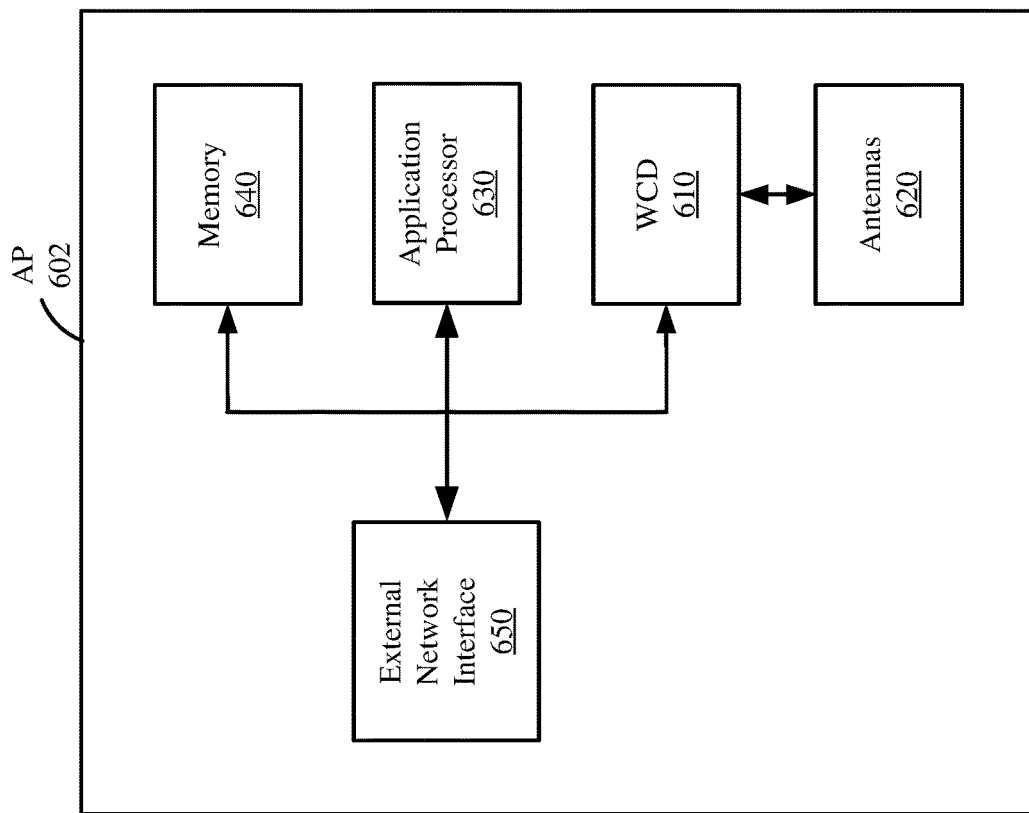
FIG. 6A shows a block diagram of an example AP.

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Aspects of the present disclosure recognize that wireless communications conforming to the IEEE 802.11 family of standards may be well-suited for RF sensing. RF sensing is a technique for sensing objects or movement in an environment based, at least in part, on the transmission and reception of electromagnetic signals. More specifically, changes in the environment can be detected based on changes in the wireless communication channel between the transmitting device and the receiving device. For example, the presence or movement of objects in the environment may interfere with or otherwise alter the phase or amplitude of wireless communication signals transmitted from a transmitting device to a receiving device, and thus, the wireless channel. The range of applications or accuracy of RF sensing may depend on the amount or detail of information communicated between the transmitting device and the receiving device.

As described above, existing IEEE 802.11 standards define a channel sounding procedure, for beamforming, whereby a beamformer transmits sounding signals (in the form of NDPs) to a beamformee. The beamformee may perform measurements on the wireless channel based on the received sounding signals. The beamformee then generates a compressed feedback matrix based on the channel measurements and transmits the compressed feedback matrix back to the beamformer. However, due to compression, the feedback matrix may not be suitable for some RF sensing applications. For example, small changes in the environment (such as a person breathing) may not translate to detectable changes in a compressed feedback matrix associated therewith. Changes in the feedback matrix can also be attributed to changes in the transmission parameters of the transmitting device or changes in the reception parameters of the receiving device. However, neither the sounding signals nor the feedback matrices defined by existing IEEE 802.11 standards provide adequate indication of the transmission parameters or the reception parameters.

In some implementations, a wireless communication network conforming to the IEEE 802.11 family of standards (such as a WLAN) may be used to implement an RF sensing system. A transmitting device may transmit a sounding dataset, over a wireless channel, to a receiving device. The sounding dataset may include information carried in one or more training fields configured for channel estimation and sounding control information based, at least in part, on a configuration of the transmitting device. The receiving device may acquire CSI for the wireless channel based on the received sounding dataset and selectively generate a channel report for the wireless channel based, at least in part, on the CSI and the sounding control information. For example, the receiving device may generate the channel report only when the characteristics of the wireless channel have changed by at least a threshold amount. The channel report may indicate changes to the wireless channel which, in turn, may be used to sense objects in the vicinity of the transmitting device or the receiving device.

Particular implementations of the subject matter described in this disclosure can be implemented to realize one or more of the following potential advantages. In some implementations, the described techniques can be used to facilitate RF sensing that can support a wide range of applications. For example, by including the configuration of the transmitting device in the sounding data transmitted to the receiving device, the receiving device can obtain more accurate measurements of the wireless channel. Further, by generating channel reports only when the wireless channel changes by a threshold amount, aspects of the present disclosure may reduce the overhead associated with the channel sounding procedure.

Figure 7A:
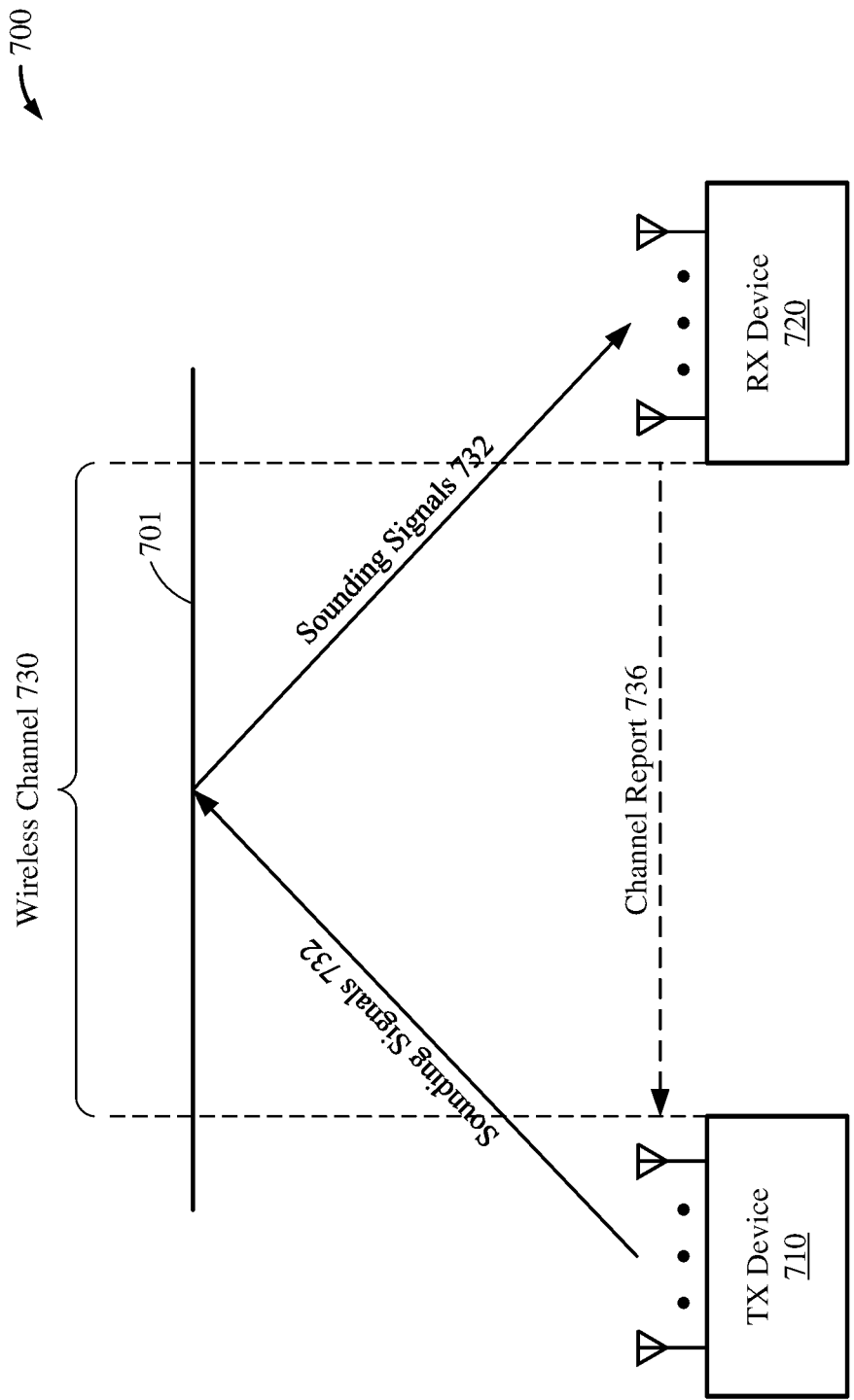
FIGS. 7A and 7B shows an example radio frequency (RF) sensing system according to some implementations.
Figure 7B:
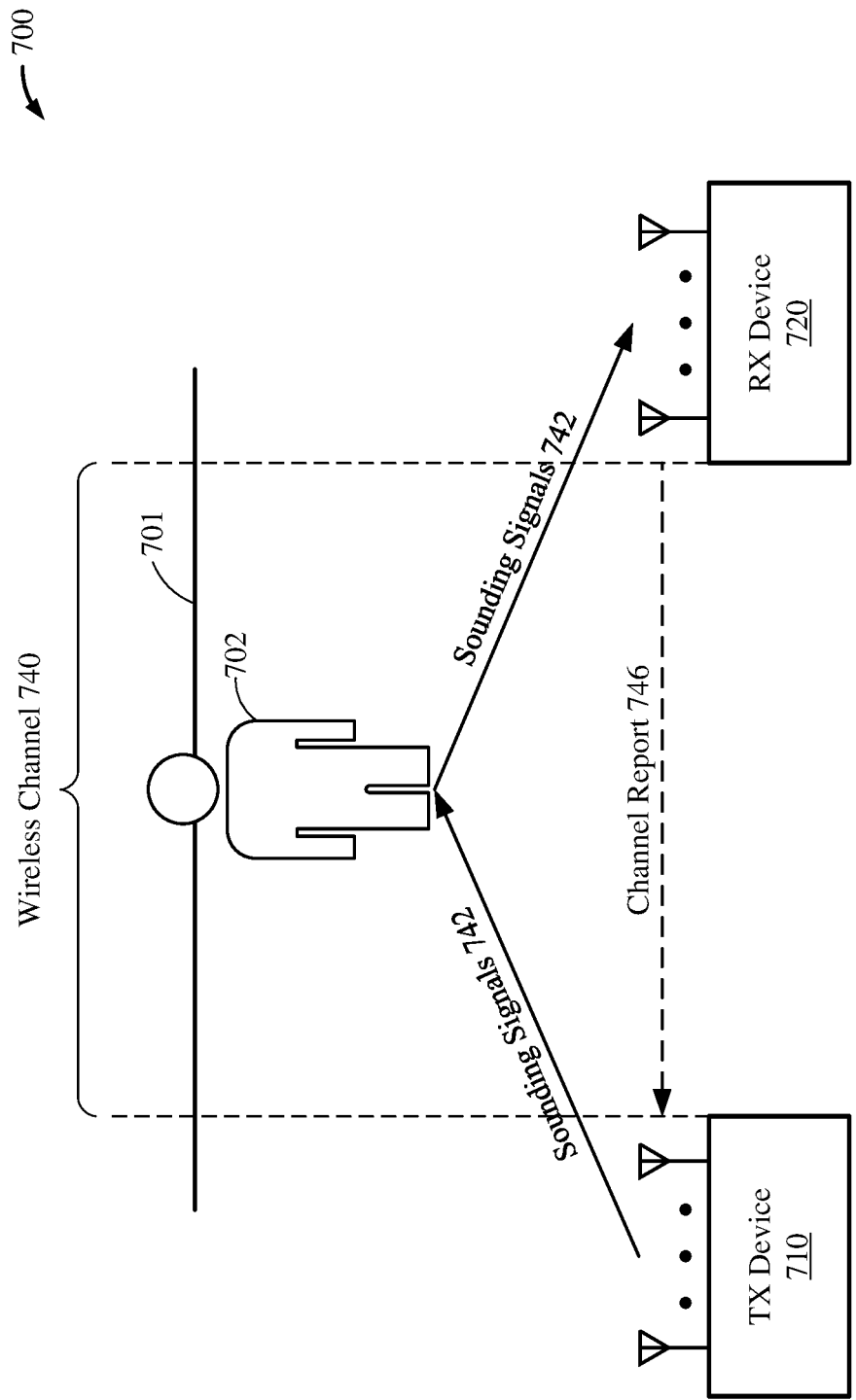

FIGS. 7A and 7B shows an example RF sensing system 700 according to some implementations. The RF sensing system 700 includes a transmitting (TX) device 710 and a receiving (RX) device 720. In some implementations, the transmitting device 710 may be one example of the AP 102 of FIG. 1 or the AP 602 of FIG. 6A. In some other implementations, the transmitting device 710 may be one example of the STA 104 of FIG. 1 or the STA 604 of FIG. 6B. In some implementations, the receiving device 720 may be one example of the AP 102 of FIG. 1 or the AP 602 of FIG. 6A. In some other implementations, the receiving device 720 may be one example of the STA 104 of FIG. 1 or the STA 604 of FIG. 6B.

With reference to FIG. 7A, the transmitting device 710 is configured to transmit sounding signals, over a wireless channel 730, to the receiving device 720. Some sounding signals may reflect off objects and surfaces in the environment before reaching the receiving device 734. As shown in FIG. 7A, a static object or surface 701 (such as a wall) is located along the path of sounding signals 732. More specifically, the surface 701 reflects the sounding signals 732 in a direction of the receiving device 720. The receiving device is configured to measure one or more characteristics of the wireless channel 730 based on the received sounding signals 732. For example, the sounding signals 732 may include one or more training fields (such as one or more of the LTFs described with respect to FIGS. 2, 3A, and 3B) that can be used for channel estimation. In some implementations, the receiving device 720 may transmit a channel report 736, based on the measured characteristics of the wireless channel 730, back to the transmitting device 710.

With reference to FIG. 7B, a new object 702 (such as a person) may enter the environment of the RF sensing system 700. The transmitting device 710 may transmit sounding signals 742, in the presence of the object 702, to the receiving device 720. The receiving device 720 may then measure one or more characteristics of a wireless channel 740 based on the received sounding signals 742. In comparison to FIG. 7A, the new object 702 may alter the propagation paths of at least some of the sounding signals transmitted by the transmitting device 710. For example, the phases or amplitudes of sounding signals received (by the receiving device 720) in the presence of the object 702 may be different than the phases or amplitudes of sounding signals received in the absence of the object 702. As a result, the wireless channel 740 may be different than the wireless channel 730 previously measured by the receiving device 720. In some implementations, the receiving device 720 may transmit a channel report 746, based on the measured characteristics of the wireless channel 740, back to the transmitting device 710.

The transmitting device 710 may detect a presence or movement of the object 702 based on differences or changes between the wireless channel 740 and the wireless channel 730. For example, the transmitting device 710 may compare the characteristics of the wireless channel 740 (based on the channel report 746) with the characteristics of the wireless channel 730 (based on the channel report 736) to detect changes in the wireless channel. Assuming the transmitting device 710 and the receiving device 720 remain static (from FIG. 7A to FIG. 7B), the differences between wireless channel 730 and wireless channel 740 may be attributed to the presence or movement of the new object 702. Example characteristics that may be detectable based on the changes in the wireless channel include, but are not limited to, movement (or lack thereof) of an object, movement patterns (such as walking, falling, or gestures), object tracking (such as movement direction, range, or location), and vital signs (such as breathing).

As described above, the range of applications for RF sensing may depend on the detail and accuracy of information communicated between the transmitting device 710 and the receiving device 720. For example, compression may reduce the level of detail needed to detect slight changes in the environment. In some implementations, the channel reports 736 and 746 generated by the receiving device 720 may include raw or uncompressed channel state information (CSI). In some aspects, the CSI may include an in-phase (I) and quadrature (Q) representation of the associated wireless channel. In some other aspects, the CSI may include a phase and amplitude representation of the associated wireless channel. In some implementations, the channel report may include a raw or uncompressed amplitude-only representation of the wireless channel. In some other implementations, the channel report may include a raw or uncompressed phase-only representation of the wireless channel. Aspects of the present disclosure recognize that an amplitude-only or phase-only representation of the wireless channel may be sufficient for some RF sensing applications and may help reduce overhead.

In some cases, the receiving device 720 may perform pre-processing on the channel measurement. For example, the CSI may be normalized to a particular reference antenna of the receiving device 720. Alternatively, or in addition, the CSI may be normalized with respect to phase (and not amplitude), amplitude (and not phase), or a combination of thereof. In some implementations, the receiving device 720 may include an indication of the pre-processing performed on the CSI (such as an indication of the reference antenna for which the CSI is normalized) in the channel report sent back to the transmitting device 710. In some other implementations, the receiving device may determine a level of quantization to be performed on the CSI. The receiving device 720 may include an indication of the quantization level of the CSI in the channel report sent back to the transmitting device 710.

Aspects of the present disclosure recognize that the properties of the wireless channel depend on the transmission parameters of the transmitting device 710 and the reception parameters of the receiving device 720, in addition to the characteristics of the environment. In other words, changing the transmission parameters of the transmitting device 710 or the reception parameters of the receiving device 720, between sounding operations, may cause the receiving device 720 to measure different CSI responsive to each sounding even if the environment did not change. To accurately attribute changes in the wireless channel to changes in the environment, additional information may be conveyed by the transmitting device 710 to the receiving device 720 (or by the receiving device 720 to the transmitting device 710) in association with the sounding signals.

In some implementations, the transmitting device 710 may be configured to transmit sounding control information to the receiving device 720 in association with each sounding signal. The sounding control information may indicate a configuration of the transmitting device 710 when transmitting a corresponding sounding signal (or set of sounding signals) to the receiving device 720. In some aspects, the sounding control information may indicate one or more transmission parameters used by the transmitting device 710 to transmit the sounding signal. Example transmission parameters may include, but are not limited to, transmit antenna indexes, transmit power per antenna, cyclic shift delays (CSDs), and any spatial mapping of the sounding signal to different transmit antennas. Thus, the indication of the transmission parameters may be used to control for variations in CSI that could otherwise be attributed to changes in the transmission parameters of the transmitting device 710.

In some other aspects, the sounding control information may include a sequence number for the corresponding sounding signal. The sequence number may provide a general indication of the transmission parameters used in transmitting the sounding signal. For example, the transmitting device 710 may change the sequence number for subsequent sounding signals if the transmitting device 710 uses different transmission parameters to transmit the subsequent sounding signals. Thus, the sequence number also may be used to control for variations in CSI that could otherwise be attributed to changes in the transmission parameters of the transmitting device 710.

Still further, in some aspects, the sounding control information may include a timing synchronization function (TSF) value of the transmitting device 710. The TSF value of the transmitting device 710 may indicate (or may be used to determine) a time at which the associated sounding signal is transmitted by the transmitting device 710. More specifically, the TSF value may be used to determine a propagation delay between the transmission of the sounding signal by the transmitting device 710 to the reception of the sounding signal by the receiving device 720. The propagation delay may be useful for some RF sensing applications (such as ranging and object tracking).

In some implementations, the receiving device 720 may include at least a subset of the sounding control information in the channel reports sent back to the transmitting device 710. In some other implementations, the channel report may indicate a configuration of the receiving device 720 when receiving a corresponding sounding signal used to generate the CSI included in the channel report. For example, the channel report may include the TSF value indicating the time at which the corresponding sounding signal was transmitted by the transmitting device 710. In some aspects, the channel report also may include a TSF value of the receiving device 720. The TSF value of the receiving device 720 may indicate a time at which the corresponding sounding signal was received by the receiving device 720. The transmitting device 710 may compare the TSF value of the receiving device 720 with the TSF value of the transmitting device 710 to determine the propagation delay of the corresponding sounding signal.

Additionally, or alternatively, the channel report may include the sequence number of the corresponding sounding signal. In some aspects, the channel report may indicate a change in the sequence number (such as with a new sequence number) if the reception parameters used to receive the corresponding sounding signal are different the reception parameters previously used to receive other sounding signals having the same sequence number. To control for variations in CSI that could otherwise be attributed to changes in transmission parameters or reception parameters, the transmitting device 710 may compare only the CSI reported by the receiving device 720 against other CSI associated with the same sequence number.

Still further, in some implementations, the channel report may indicate one or more reception parameters used by the receiving device 720 to receive the corresponding sounding signal. Example reception parameters may include, but are not limited to, receive antenna indexes, automatic gain control (AGC) per receive chain, estimated carrier frequency offset (CFO) or pre-correction, receive signal strength indication (RSSI) per antenna, or any spatial mapping of the sounding signal to different receive antennas. To control for variation in CSI that could otherwise be attributed to changes in reception parameters, the transmitting device 710 may compare only the CSI reported by the receiving device 720 against other CSI associated with at least the same reception parameters.

The sounding control information and the training fields (used for channel estimation) may be collectively referred to as a sounding dataset. In some implementations, the sounding dataset may be transmitted as a single sounding packet or PDU. For example, the sounding control information and the training fields may be included in different portions of the same sounding packet. Alternatively, or additionally, at least some of the sounding control information may be included in the same portion of the sounding packet that includes the training fields. In some other implementations, the sounding dataset may be distributed across multiple packets. For example, the training fields may be included in a sounding packet or PDU and the sounding control information may be included in a separate message or packet associated with (or immediately preceding) the sounding packet or PDU.

Figure 8A:
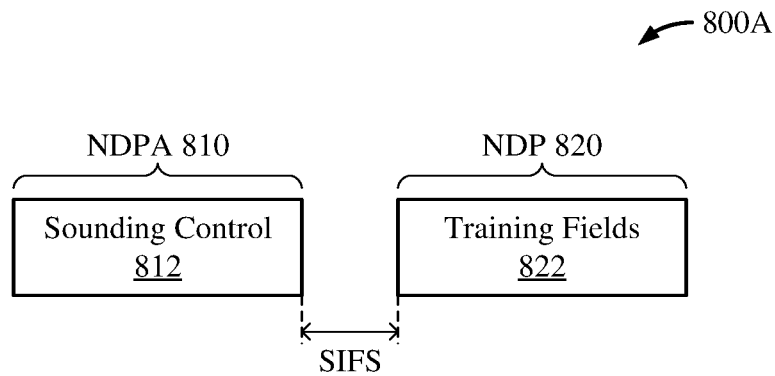
FIG. 8A shows an example sounding dataset usable for RF sensing according to some implementations.

FIG. 8A shows an example sounding dataset 800A usable for RF sensing according to some implementations. In some implementations, the sounding dataset 800A may be one example of any of the sounding signals 732 or 742 of FIGS. 7A and 7B, respectively. The sounding dataset 800A includes sounding control information 812 and one or more training fields 822 that may be used for channel estimation. As shown in FIG. 8A, the sounding control information 812 is included in a null data packet announcement (NDPA) 810 and the training fields 822 are included in a null data packet (NDP) 820 immediately following the NDPA 810. The NDP 820 and the NDPA 810 may be separated by a short interframe space (SIFS) duration.

In some implementations, the sounding control information 812 may indicate a configuration of the transmitting device to be used in transmitting the sounding dataset 800A (such as described with respect to FIGS. 7A and 7B). In some other implementations, the sounding control information 812 may indicate one or more parameters to be used by a receiving device to encode a channel report. Example encoding parameters may include, but are not limited to, a minimum or maximum quantization level for the CSI, a bandwidth or resource unit (RU) allocation, a number of spatial streams, or one or more antenna indexes. Still further, in some implementations, the sounding control information 812 may identify a group of receiving devices as intended recipients of the sounding dataset 800A.

Figure 8B:
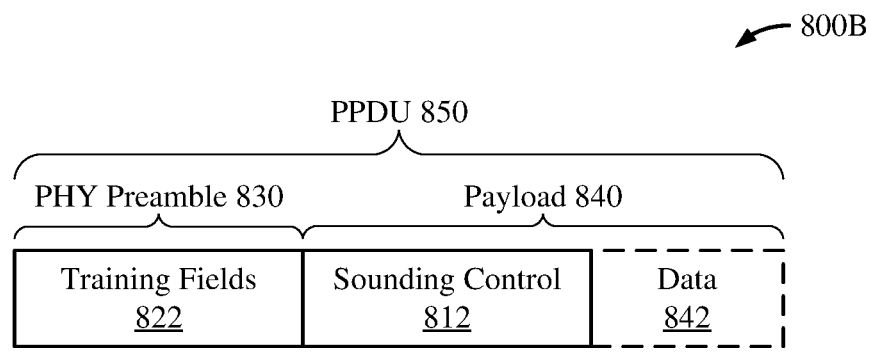
FIG. 8B shows another example sounding dataset usable for RF sensing according to some implementations.

FIG. 8B shows another example sounding dataset 800B usable for RF sensing according to some implementations. In some implementations, the sounding dataset 800B may be one example of any of the sounding signals 732 or 742 of FIGS. 7A and 7B, respectively. As shown in FIG. 8B, the sounding control information 812 and the training fields 822 are included in a single PPDU 850. More specifically, the training fields 822 are included in a PHY preamble 830 of the PPDU 850 while the sounding control information 812 is included in a payload 840 of the PPDU 850. In some implementations, the PPDU 850 may be a sounding PPDU such as defined by existing or future IEEE 802.11 standards. In this case, the training fields 822 may include sounding LTFs that are configured for full channel estimation. In some other implementations, the PPDU 850 may be a data PPDU such as defined by existing or future IEEE 802.11 standards. In this case, the training fields 822 may include standard LTFs that can be used for channel estimation limited to the MIMO configuration used for transmitting the PPDU 850. Still further, in some implementations, the payload 840 also may include data 842 intended for the receiving device(s).

Figure 8C:
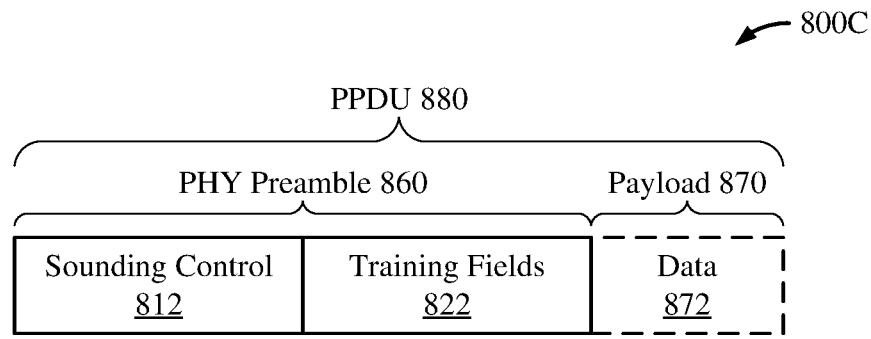
FIG. 8C shows another example sounding dataset usable for RF sensing according to some implementations.

FIG. 8C shows another example sounding dataset 800C usable for RF sensing according to some implementations. In some implementations, the sounding dataset 800C may be one example of any of the sounding signals 732 or 742 of FIGS. 7A and 7B, respectively. As shown in FIG. 8C, the sounding control information 812 and the training fields 822 are included in a single PPDU 880. More specifically, the sounding control information 812 and the training fields 822 are included together in a PHY preamble 860 of the PPDU 880. The PPDU 880 may correspond to a new PPDU format that is not defined by existing IEEE 802.11 standards. In some implementations, the PPDU 880 may further include a payload 870 which may include data 872 intended for the receiving device(s).

As described above, the receiving device in an RF sensing system may generate a channel report based on a received sounding dataset. The channel report may include raw or uncompressed CSI as well as additional information that may be used to characterize the wireless channel. To reduce overhead, the channel reports may be generated or transmitted less frequently than the sounding datasets. In some implementations, the receiving device may generate a channel report only after receiving a number (n) of sounding datasets from the transmitting device. In some other implementations, the receiving device may generate a channel report only after one or more conditions are satisfied. Still further, in some implementations, the receiving device may not transmit any channel reports to the transmitting device. For example, some receiving devices (rather than transmitting devices) may be configured to interpret differences in CSI for RF sensing purposes. Alternatively, or additionally, the transmitting device and the receiving device may be communicatively coupled to a shared backhaul. To further reduce wireless communications overhead, the receiving device may provide the channel reports to the backhaul rather than transmit the channel reports over the wireless medium.

Figure 9:
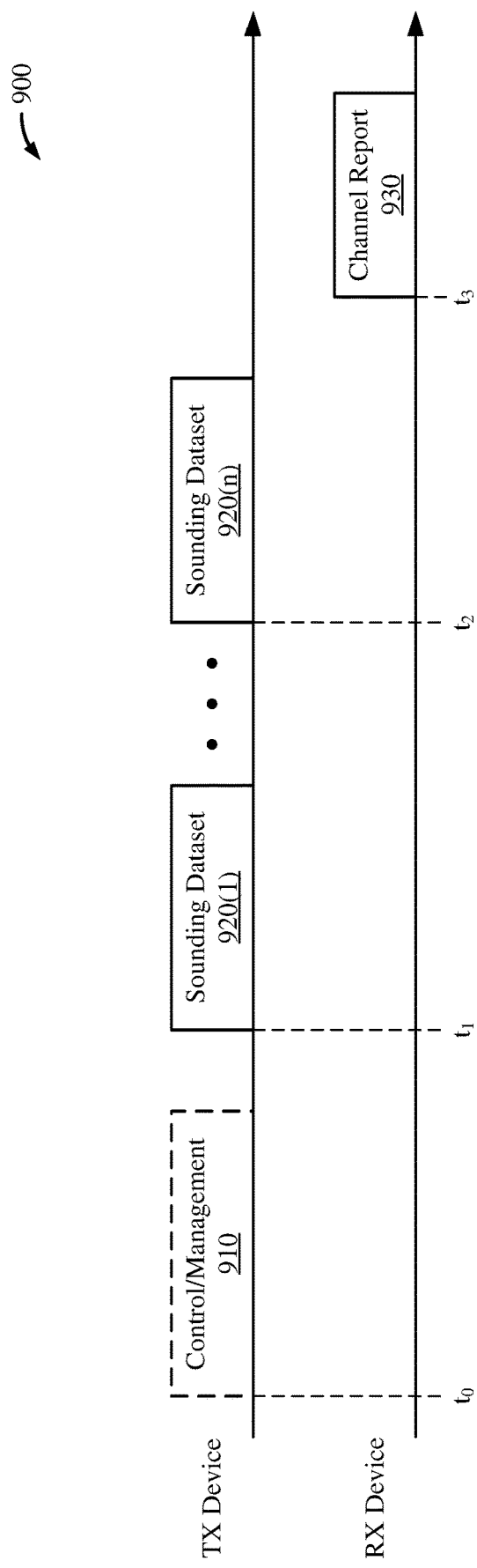
FIG. 9 shows a timing diagram illustrating an example message exchange between a transmitting device and a receiving device in an RF sensing system according to some implementations.

FIG. 9 shows a timing diagram illustrating an example message exchange between a transmitting (TX) device and a receiving (RX) device in an RF sensing system according to some implementations. In some implementations, the TX device and the RX device may be examples of the transmitting device 710 and the receiving device 720, respectively, of FIGS. 7A and 7B. For simplicity, only one RX device is shown in FIG. 9. However, in actual implementations, the RF sensing system may include any number of RX devices.

In some implementations, the TX device may transmit a control or management frame 910 to the RX device at time $t_0$. The control or management frame 910 may include sounding control information that is generally applicable to a number (n) of datasets 920(1)-920(n) to be transmitted as part of an RF sensing procedure. As described above, each of the sounding dataset 920(1)-920(n) may include sounding control information which may indicate a configuration of the TX device at the time the respective sounding datasets is transmitted, one or more parameters to be used by a receiving device to encode a channel report, or a group of RX devices to receive the sounding datasets. To reduce overhead, any sounding control information that is common to the sounding datasets 920(1)-920(n) may be included in the control management frame 910 (rather than in individual sounding datasets).

In some implementations, the sounding control information included in the control or management frame 910 (or alternatively, in one or more of the sounding datasets 920(1)-920(n)) may indicate one or more conditions for generating or transmitting a channel report. In some aspects, the TX device may require the RX device to generate channel reports based on aggregated data from multiple sounding datasets. For example, the sounding control information may indicate that the RX device should receive all n sounding datasets 920(1)-9201(n) before generating a channel report (if at all). In some other aspects, the TX device may require the RX device to generate a channel report only if the RSSI of a corresponding dataset exceeds an RSSI threshold. For example, CSI generated from a weak sounding signal may be less accurate or reliable than CSI generated from stronger sounding signals. Thus, the sounding control information may indicate the RSSI threshold that must be satisfied in order to generate a corresponding channel report.

Aspects of the present disclosure recognize that RF sensing techniques depend on changing channel conditions to detect objects or movement in the environment. Thus, to reduce overhead, the RX device may report only differences in CSI from two or more sounding datasets. The sounding control information included in the control or management frame 910 (or in one or more of the sounding datasets) may indicate which of the sounding datasets 920(1)-920(n) is to be used as a "reference" dataset in determining the difference in CSI. Alternatively, or additionally, the sounding control information included in the control or management frame 910 may identify multiple reference datasets among the sounding datasets 920(1)-920(n) and the RX device may be separately notified as to which of the reference datasets to use in generating a particular channel report. In some implementations, the RX device may require the TX device to generate a channel report only if the difference in CSI exceeds a threshold amount. For example, the sounding control information may indicate the CSI threshold that must be satisfied to generate a channel report.

At time $t_1$, the TX device transmits a first sounding dataset 920(1) to the RX device. In some implementations, the sounding dataset 920(1) may be one example of any of the sounding datasets 800A-800C described with respect to FIGS. 8A-8C, respectively. The sounding dataset 920(1) may include sounding control information and one or more training fields to be used by the RX device to obtain a first measurement of the wireless communications channel between the TX device and the RX device. In some implementations, the sounding control information may indicate whether the first sounding dataset 920(1) corresponds to a reference dataset. Assuming the first sounding dataset 920(1) is a reference dataset, the RX device may store the CSI acquired from the sounding dataset 920(1) as a reference CSI.

At time $t_2$, the TX device transmits an $n^{th}$ sounding dataset 920(n) to the RX device. In some implementations, the sounding dataset 920(n) also may be one example of any of the sounding datasets 800A-800C described with respect to FIGS. 8A-8C, respectively. The sounding dataset 920(n) may include sounding control information and one or more training fields to be used by the RX device to obtain an $n^{th}$ measurement of the wireless communications channel between the TX device and the RX device. Since the sounding dataset 920(n) is the final dataset in the sounding sequence, the RX device may selectively transmit a channel report 930 back to the TX device at time $t_3$. As described above, the channel report 930 may include a subset of the sounding control information received from the TX device. Additionally, or alternatively, the channel report 930 may indicate a configuration of the RX device at the time one or more of the sounding datasets 920(1)-920(n) was received.

In some implementations, the channel report 930 may include an average or aggregate CSI measured by the RX device based the received sounding datasets 920(1)-920(n). In some other implementations, the channel report 930 may include a difference in the CSI acquired based on the $n^{th}$ sounding dataset 920(n) and a reference CSI (such as the CSI acquired based on the first sounding dataset 920(1)). For example, the difference in CSI may be expressed as an error vector magnitude (EVM). In some implementations, the RX device may determine a level of quantization to be performed on the difference in CSI. For example, the RX device may select any quantization level that conforms to the maximum or minimum quantization thresholds indicated in the sounding control information. The RX device may include an indication of the quantization level in the channel report 930.

In some implementations, the RX device may generate or transmit a channel report only if one or more conditions are satisfied. For example, the reporting conditions may be indicated in the sounding control information received from the TX device. In some aspects, the RX device may not generate a channel report if the RSSI threshold associated with the received sounding datasets 920(1)-920(n) is below an RSSI threshold. In some other aspects, the RX device may not generate a channel report if the difference in the CSI is below a CSI threshold. Still further, in some aspects, the RX device also may not generate a channel report if it was unable to correctly receive or decode one or more of the sounding datasets 920(1)-920(n). For example, the RX device may fail to receive one or more of the sounding datasets 920(1)-920(n) as a result of too much interference on the wireless channel, a failed cyclic redundancy check (CRC), among other examples.

In some implementations, the RX device may transmit a response to the TX device, at time $t_3$, even if no channel report was generated. For example, the response may provide a reason for which no channel report was generated or indicate which reporting conditions were not satisfied. Alternatively, the response may be a short acknowledgement frame (ACK or QoS null) which does not include a channel report. In some other implementations, the RX device may not send any response to the TX device at time $t_3$. As described above, the TX device may not expect to receive any channel report or response from the RX device in some RF sensing configurations (such as where the RX device performs RF sensing or the TX device and the RX device are communicatively coupled to a shared backhaul). The TX device also may explicitly indicate, in the sounding control information, that no channel report is to be sent back to the TX device.

In the example of FIG. 9, the RX device selectively generates a channel report for every n sounding datasets (where n is depicted as an integer number greater than 1). However, in some other implementations, the RX device may selectively generate channel reports after each sounding dataset received from the TX device. As described above, the channel report may include raw or uncompressed CSI or a difference in CSI acquired in response to each sounding dataset received from the TX device. In some implementations, the RX device may use the CSI acquired from the most recent sounding dataset as a reference CSI to be compared against the CSI acquired from the next sounding dataset received from the TX device. In some other implementations, the RX device may compare the reference CSI against the CSI acquired from the $n^{th}$ sounding dataset received thereafter (where n is any integer number greater than 1).

Figure 10A:
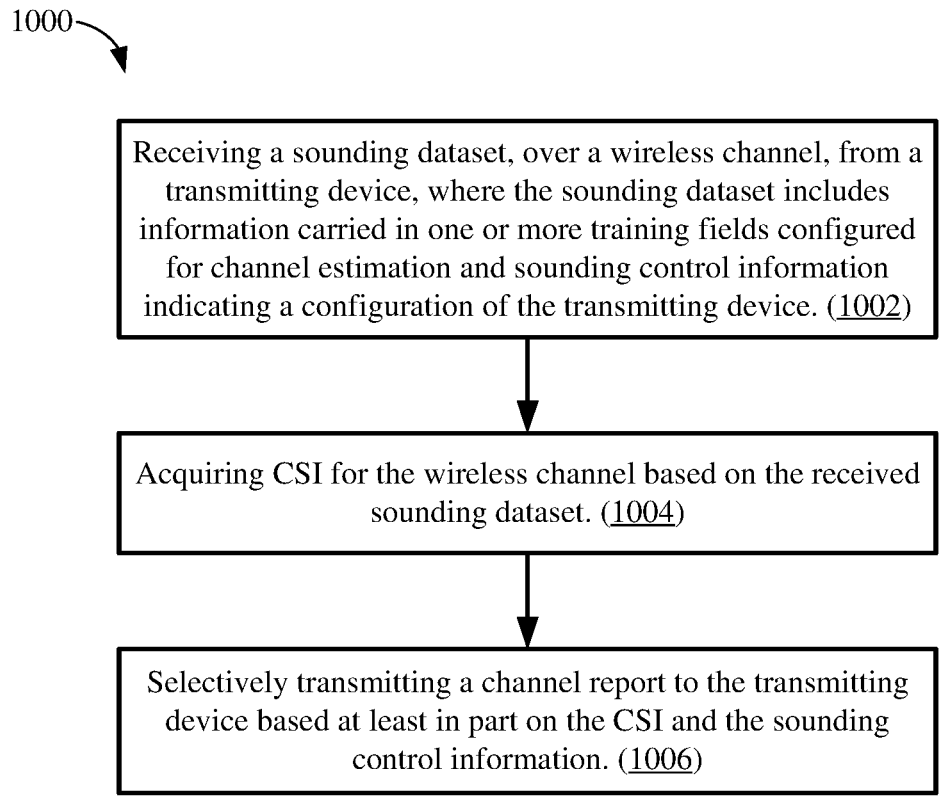
FIG. 10A shows a flowchart illustrating an example process for wireless communication that supports sounding for RF sensing according to some implementations.

FIG. 10A shows a flowchart illustrating an example process 1000 for wireless communication that supports sounding for RF sensing according to some implementations. In some implementations, the process 1000 may be performed by a wireless communication device operating as or within an AP, such as one of the APs 102 or 602 described above with reference to FIGS. 1 and 6A respectively. In some other implementations, the process 1000 may be performed by a wireless communication device operating as or within a network node, such as one of the STAs 104 or 604 described above with reference to FIGS. 1 and 6B, respectively.

In some implementations, the process 1000 begins in block 1002 with receiving a sounding dataset, over a wireless channel, from a transmitting device, where the sounding dataset includes information carried in one or more training fields configured for channel estimation and sounding control information indicating a configuration of the transmitting device. In some implementations, the sounding control information may include a sequence number indicating the configuration of the transmitting device. In some implementations, the sounding control information may include timing information or information indicating one or more transmission parameters associated with the transmission of the sounding dataset by the transmitting device. In block 1004, the process 1000 proceeds with acquiring CSI for the wireless channel based on the received sounding dataset. In block 1006, the process 1000 proceeds with selectively transmitting a channel report to the transmitting device based at least in part on the CSI and the sounding control information.

In some implementations, the channel report may include a sequence number indicating a configuration of the wireless communication device. In some implementations, the channel report may include timing information or information indicating one or more reception parameters associated with the reception of the sounding dataset. In some implementations, the operation for selectively transmitting a channel report, in block 1006, may include obtaining an indication that an RSSI associated with the sounding dataset is below an RSSI threshold, where no channel report is transmitted to the transmitting device based on the indication that the RSSI is below the RSSI threshold.

Figure 10B:
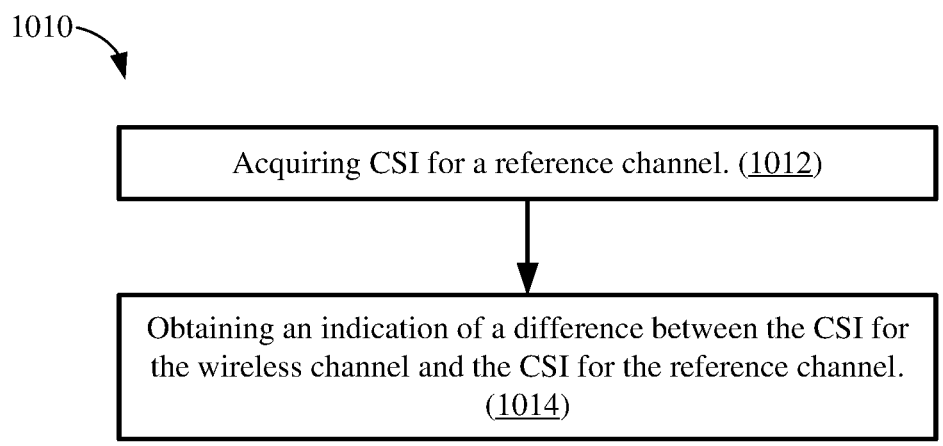
FIG. 10B shows a flowchart illustrating an example process for wireless communication that supports sounding for RF sensing according to some implementations.

FIG. 10B shows a flowchart illustrating an example process 1010 for wireless communication that supports sounding for RF sensing according to some implementations. In some implementations, the process 1010 may be performed by a wireless communication device operating as or within an AP, such as one of the APs 102 or 602 described above with reference to FIGS. 1 and 6A respectively. In some other implementations, the process 1010 may be performed by a wireless communication device operating as or within a network node, such as one of the STAs 104 or 604 described above with reference to FIGS. 1 and 6B, respectively.

With reference for example to FIG. 10A, the process 1010 may be performed prior to the operation for selectively transmitting a channel report in block 1006 of the process 1000. In some implementations, the process 1010 begins in block 1012 with acquiring CSI for a reference channel. In block 1014, the process 1010 proceeds with obtaining an indication of a difference between the CSI for the wireless channel and the CSI for the reference channel. In some implementations, the channel report may include the indication of the difference in CSI. In some implementations, the operation for selectively transmitting a channel report, in block 1006, may include comparing the difference in CSI to a CSI difference threshold, where no channel report is transmitted to the transmitting device based on the difference in CSI being below the CSI difference threshold.

Figure 11A:
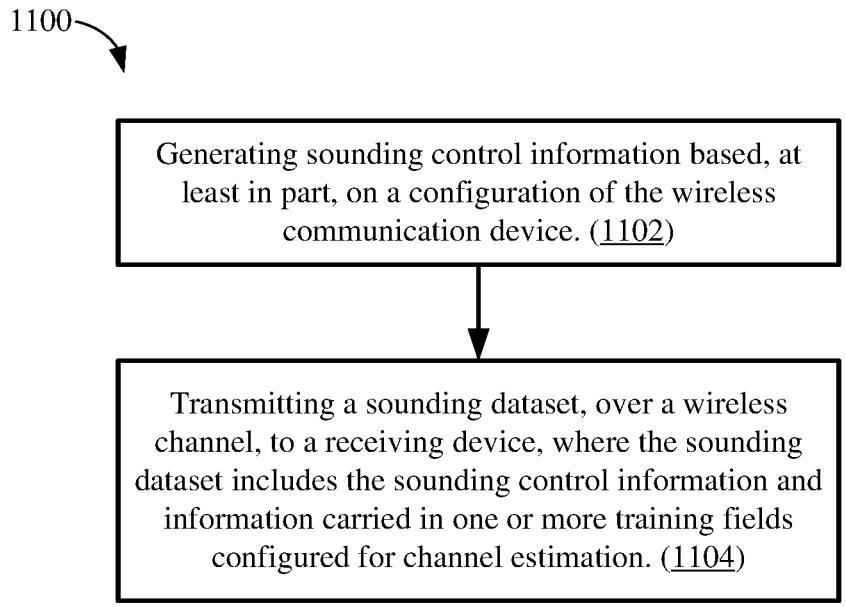
FIG. 11A shows a flowchart illustrating an example process for wireless communication that supports sounding for RF sensing according to some implementations.

FIG. 11A shows a flowchart illustrating an example process 1100 for wireless communication that supports sounding for RF sensing according to some implementations. In some implementations, the process 1100 may be performed by a wireless communication device operating as or within an AP, such as one of the APs 102 or 602 described above with reference to FIGS. 1 and 6A respectively. In some other implementations, the process 1100 may be performed by a wireless communication device operating as or within a network node, such as one of the STAs 104 or 604 described above with reference to FIGS. 1 and 6B, respectively.

In some implementations, the process 1100 begins in block 1102 with generating sounding control information based, at least in part, on a configuration of the wireless communication device. In some implementations, the sounding control information may include a sequence number indicating the configuration of the wireless communication device. In some implementations, the sounding control information may include timing information or one or more transmission parameters associated with the transmission of the sounding dataset. In block 1104, the process 1100 proceeds with transmitting a sounding dataset, over a wireless channel, to a receiving device, where the sounding data includes the sounding control information and information carried in one or more training fields configured for channel estimation.

Figure 11B:
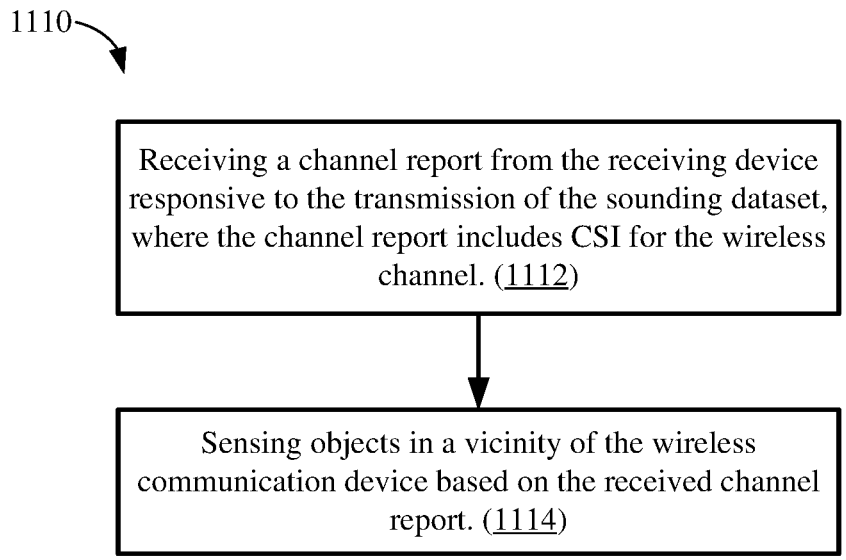
FIG. 11B shows a flowchart illustrating an example process for wireless communication that supports sounding for RF sensing according to some implementations.

FIG. 11B shows a flowchart illustrating an example process 1110 for wireless communication that supports sounding for RF sensing according to some implementations. In some implementations, the process 1110 may be performed by a wireless communication device operating as or within an AP, such as one of the APs 102 or 602 described above with reference to FIGS. 1 and 6A respectively. In some other implementations, the process 1110 may be performed by a wireless communication device operating as or within a network node, such as one of the STAs 104 or 604 described above with reference to FIGS. 1 and 6B, respectively.

With reference for example to FIG. 11A, the process 1110 may be performed after the operation for transmitting the sounding dataset in block 1104 of the process 1100. In some implementations, the process 1110 begins in block 1112 with receiving a channel report from the receiving device responsive to the transmission of the sounding dataset, where the channel report includes CSI for the wireless channel. In some implementations, the channel report may include a subset of the sounding control information. In some implementations, the channel report may include a sequence number indicating a configuration of the receiving device. In some implementations, the channel report may include timing information or information indicating one or more reception parameters associated with a reception of the sounding dataset by the receiving device. In block 1114, the process 1110 proceeds with sensing objects in a vicinity of the wireless communication device based on the received channel report.

In some implementations, the channel report may further indicate a difference in CSI between the wireless channel and a reference channel. In some implementations, the sounding control information may identify the reference channel. In some implementations, the sounding control information may identify the wireless channel as a reference channel for future channel reports.

Figure 12:
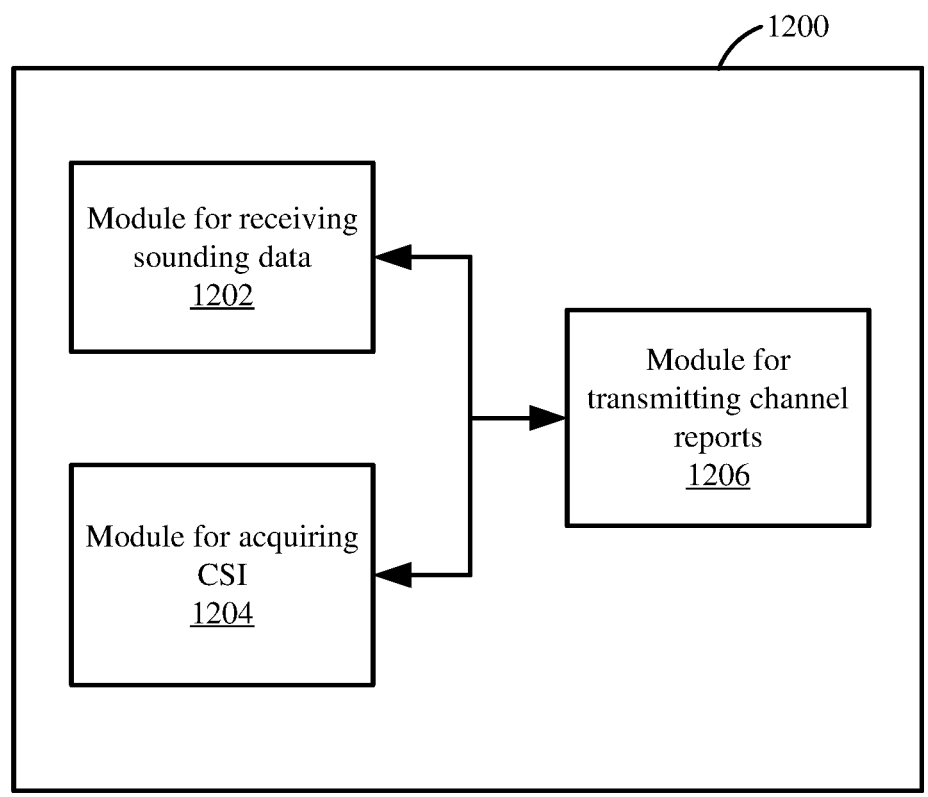
FIG. 12 shows a block diagram of an example wireless communication device for use in wireless communication that supports sounding for RF sensing according to some implementations.

FIG. 12 shows a block diagram of an example wireless communication device 1200 for use in wireless communication according to some implementations. In some implementations, the wireless communication device 1200 may be configured to perform any of the processes 1000 or 1010 described above with reference to FIGS. 10A and 10B, respectively. In some implementations, the wireless communication device 1200 can be an example implementation of the wireless communication device 500 described above with reference to FIG. 5. For example, the wireless communication device 1200 can be a chip, SoC, chipset, package or device that includes at least one processor and at least one modem (for example, a Wi-Fi (IEEE 802.11) modem or a cellular modem). In some implementations, the wireless communication device 1200 can be a device for use in an AP, such as one of the APs 102 and 602 described above with reference to FIGS. 1 and 6A, respectively. In some other implementations, the wireless communication device 1200 can be a device for use in a STA, such as one of the STAs 104 and 604 described above with reference to FIGS. 1 and 6B, respectively.

The wireless communication device 1200 includes a module for receiving sounding data 1202, a module for acquiring CSI 1204, and a module for transmitting channel reports 1206. Portions of one or more of the modules 1202, 1204, and 1206 may be implemented at least in part in hardware or firmware. In some implementations, at least some of the modules 1202, 1204, and 1206 are implemented at least in part as software stored in a memory (such as the memory 508). For example, portions of one or more of the modules 1202, 1204, and 1206 can be implemented as non-transitory instructions (or "code") executable by a processor (such as the processor 506) to perform the functions or operations of the respective module.

The module for receiving sounding data 1202 is configured to receive a sounding dataset, over a wireless channel, from a transmitting device, where the sounding dataset includes information carried in one or more training fields configured for channel estimation and sounding control information indicating a configuration of the transmitting device. The module for acquiring CSI 1204 is configured to acquire CSI for the wireless channel based on the received sounding dataset. The module for transmitting channel reports 1206 is configured to selectively transmit a channel report to the transmitting device based at least in part on the CSI and the sounding control information.

Figure 13:
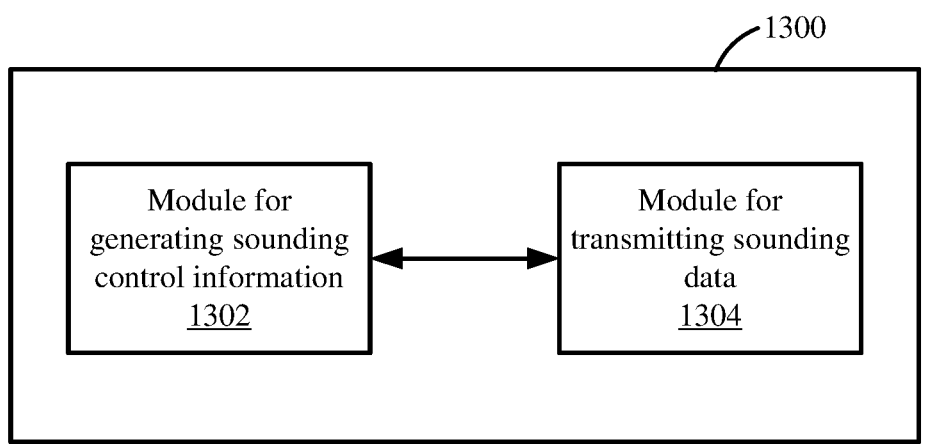
FIG. 13 shows a block diagram of an example wireless communication device for use in wireless communication that supports sounding for RF sensing according to some implementations.

FIG. 13 shows a block diagram of an example wireless communication device 1300 for use in wireless communication according to some implementations. In some implementations, the wireless communication device 1300 may be configured to perform any of the processes 1100 or 1110 described above with reference to FIGS. 11A and 11B, respectively. In some implementations, the wireless communication device 1300 can be an example implementation of the wireless communication device 500 described above with reference to FIG. 5. For example, the wireless communication device 1300 can be a chip, SoC, chipset, package or device that includes at least one processor and at least one modem (for example, a Wi-Fi (IEEE 802.11) modem or a cellular modem). In some implementations, the wireless communication device 1300 can be a device for use in a STA, such as one of the STAs 104 and 604 described above with reference to FIGS. 1 and 6B, respectively. In some other implementations, the wireless communication device 1300 can be a device for use in an AP, such as one of the APs 102 and 602 described above with reference to FIGS. 1 and 6A, respectively.

The wireless communication device 1300 includes a module for generating sounding control information 1302 and a module for transmitting sounding data 1304. Portions of one or more of the modules 1302 and 1304 may be implemented at least in part in hardware or firmware. In some implementations, at least some of the modules 1302 and 1304 are implemented at least in part as software stored in a memory (such as the memory 508). For example, portions of one or more of the modules 1302 and 1304 can be implemented as non-transitory instructions (or "code") executable by a processor (such as the processor 506) to perform the functions or operations of the respective module.

The module for generating sounding control information 1302 is configured to generate sounding control information based, at least in part, on a configuration of the wireless communication device. The module for transmitting sounding data 1304 is configured to transmit a sounding dataset, over a wireless channel, to a receiving device, where the sounding dataset includes the sounding control information and information carried in one or more training fields configured for channel estimation.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Implementation examples are described in the following numbered clauses:

1. A method for wireless communication performed by a wireless communication device, including:
   receiving a sounding dataset, over a wireless channel, from a transmitting device, the sounding dataset including information carried in one or more training fields configured for channel estimation and sounding control information indicating a configuration of the transmitting device;
   acquiring channel state information (CSI) for the wireless channel based on the received sounding dataset; and
   selectively transmitting a channel report to the transmitting device based at least in part on the CSI and the sounding control information.
2. The method of clause 1, wherein the sounding control information includes a sequence number indicating the configuration of the transmitting device.
3. The method of any of clauses 1 or 2, wherein the sounding control information includes timing information or information indicating one or more transmission parameters associated with a transmission of the sounding dataset by the transmitting device.
4. The method of any of clauses 1-3, wherein the channel report includes a subset of the sounding control information.
5. The method of any of clauses 1-4, wherein the channel report includes a sequence number indicating a configuration of the wireless communication device.
6. The method of any of clauses 1-5, wherein the channel report includes timing information or information indicating one or more reception parameters associated with the reception of the sounding dataset.
7. The method of any of clauses 1-6, wherein the selective transmitting of a channel report includes:
   obtaining an indication that a received signal strength indication (RSSI) associated with the sounding dataset is below an RSSI threshold, no channel report being transmitted to the transmitting device based on the indication that the RSSI is below the RSSI threshold.
8. The method of any of clauses 1-6, further including:
   acquiring CSI for a reference channel; and
   obtaining an indication of a difference between the CSI for the wireless channel and the CSI for the reference channel.
9. The method of any of clauses 1-6 or 8, wherein the channel report includes the indication of the difference in CSI.
10. The method of any of clauses 1-6, or 8, wherein the selective transmitting of a channel report comprises:
    comparing the difference in CSI to a CSI difference threshold, no channel report being transmitted to the transmitting device based on the difference in CSI being below the CSI difference threshold.
11. A wireless communication device including:
    at least one modem;
    at least one processor communicatively coupled with the at least one modem; and
    at least one memory communicatively coupled with the at least one processor and storing processor-readable code that, when executed by the at least one processor in conjunction with the at least one modem, is configured to perform the method of any one or more of clauses 1-10.
12. A method for wireless communication performed by a wireless communication device, including:
    generating sounding control information based, at least in part, on a configuration of the wireless communication device; and
    transmitting a sounding dataset, over a wireless channel, to a receiving device, the sounding dataset including the sounding control information and information carried in one or more training fields configured for channel estimation.
13. The method of clause 12, wherein the sounding control information includes a sequence number indicating the configuration of the wireless communication device.
14. The method of any of clauses 12 or 13, wherein the sounding control information includes timing information or one or more transmission parameters associated with the transmission of the sounding dataset.
15. The method of any of clauses 12-14, further including:
    receiving a channel report from the receiving device responsive to the transmission of the sounding dataset, the channel report including channel station information (CSI) for the wireless channel; and
    sensing objects in a vicinity of the wireless communication device based on the received channel report.

16. The method of any of clauses 12-15, wherein the channel report includes a subset of the sounding control information.
17. The method of any of clauses 12-16, wherein the channel report includes a sequence number indicating a configuration of the receiving device.
18. The method of any of clauses 12-17, wherein the channel report includes timing information or information indicating one or more reception parameters associated with a reception of the sounding dataset by the receiving device.
19. The method of any of clauses 12-18, wherein the channel report indicates a difference in CSI between the wireless channel and a reference channel.
20. The method of any of clauses 12-19, wherein the sounding control information identifies the reference channel.
21. The method of any of clauses 12-20, wherein the sounding control information identifies the wireless channel as a reference channel for future channel reports.
22. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 12-21.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
receiving, over a wireless channel, sounding control information indicating a configuration of a transmitting device, wherein the sounding control information includes an indication of a number that indicates one or more transmission parameters for one or more sounding packets and timing information associated with the one or more sounding packets;
receiving a sounding packet, over the wireless channel, from the transmitting device, the sounding packet including information carried in one or more training fields configured for channel estimation;
acquiring channel state information (CSI) for the wireless channel based on the received sounding packet; and
selectively transmitting a channel report to the transmitting device based at least in part on the CSI and the sounding control information, wherein the channel report includes the indication of the number that indicates the one or more transmission parameters for the one or more sounding packets and the timing information associated with the one or more sounding packets.

2. The method of claim 1, wherein the indication of the number includes a sequence number indicating the configuration of the transmitting device.

3. The method of claim 1, wherein the sounding control information includes the timing information and information indicating the one or more transmission parameters associated with a transmission of the sounding packet by the transmitting device.

4. The method of claim 3, wherein the channel report includes a subset of the sounding control information.

5. The method of claim 1, wherein the channel report includes a sequence number indicating a configuration of the wireless communication device.

6. The method of claim 1, wherein the channel report includes the timing information and information indicating one or more reception parameters associated with the reception of the sounding packet.

7. The method of claim 1, wherein the selective transmitting of a channel report comprises:
obtaining an indication that a received signal strength indication (RSSI) associated with the sounding packet is below an RSSI threshold, no channel report being transmitted to the transmitting device based on the indication that the RSSI is below the RSSI threshold.

8. The method of claim 1, further comprising:
acquiring CSI for a reference channel; and
obtaining an indication of a difference between the CSI for the wireless channel and the CSI for the reference channel.

9. The method of claim 8, wherein the channel report includes the indication of the difference in CSI.

10. The method of claim 8, wherein the selective transmitting of a channel report comprises:
comparing the difference in CSI to a CSI difference threshold, no channel report being transmitted to the transmitting device based on the difference in CSI being below the CSI difference threshold.

11. A wireless communication device comprising:
at least one modem;

at least one processor communicatively coupled with the
at least one modem; and
at least one memory communicatively coupled with the at
least one processor and storing processor-readable code
that, when executed by the at least one processor in
conjunction with the at least one modem, is configured
to:
receive, over a wireless channel, sounding control
information indicating a configuration of a transmitting device, wherein the sounding control information includes an indication of a number that indicates
one or more transmission parameters for one or more
sounding packets and timing information associated
with the one or more sounding packets;
receive a sounding packet, over the wireless channel,
from the transmitting device, the sounding packet
including information carried in one or more training
fields configured for channel estimation;
acquire channel state information (CSI) for the wireless
channel based on the received sounding packet; and
selectively transmit a channel report to the transmitting
device based at least in part on the CSI and the
sounding control information, wherein the channel
report includes an indication of the number that
indicates the one or more transmission parameters
for the one or more sounding packets and the timing
information associated with the one or more sounding packets.

12. The wireless communication device of claim 11, wherein the selective transmitting of a channel report comprises:
obtaining an indication that a received signal strength indication (RSSI) associated with the sounding packet is below an RSSI threshold, no channel report being transmitted to the transmitting device based on the indication that the RSSI is below the RSSI threshold.

13. The wireless communication device of claim 11, wherein execution of the processor-readable code is further configured to:
acquire CSI for a reference channel; and
obtain an indication of a difference between the CSI for the wireless channel and the CSI for the reference channel.

14. The wireless communication device of claim 13, wherein the channel report includes the indication of the difference in CSI.

15. The wireless communication device of claim 13, wherein the selective transmitting of a channel report comprises:
comparing the difference in CSI to a CSI difference threshold, no channel report being transmitted to the transmitting device based on the difference in CSI being below the CSI difference threshold.

16. A method for wireless communication performed by a wireless communication device, comprising:
transmitting, over a wireless channel, sounding control information indicating a configuration of the wireless communication device, wherein the sounding control information includes an indication of a number that indicates one or more transmission parameters for one or more sounding packets and timing information associated with the one or more sounding packets;
transmitting a sounding packet, over the wireless channel, to a receiving device, the sounding packet including information carried in one or more training fields configured for channel estimation; and receiving a channel report from the receiving device responsive to the transmission of the sounding packet, the channel report including channel state information (CSI) for the wireless channel, and the channel report including the indication of the number that indicates the one or more transmission parameters for the one or more sounding packets and the timing information associated with the one or more sounding packets.

17. The method of claim 16, wherein the indication of the number includes a sequence number indicating the configuration of the wireless communication device.

18. The method of claim 16, wherein the sounding control information includes the timing information and the one or more transmission parameters associated with the transmission of the sounding packet.

19. The method of claim 16, further comprising:
sensing objects in a vicinity of the wireless communication device based on the received channel report.

20. The method of claim 16, wherein the channel report includes a subset of the sounding control information.

21. The method of claim 16, wherein the channel report includes a sequence number indicating a configuration of the receiving device.

22. The method of claim 16, wherein the channel report includes the timing information and information indicating one or more reception parameters associated with a reception of the sounding packet by the receiving device.

23. The method of claim 16, wherein the channel report indicates a difference in CSI between the wireless channel and a reference channel.

24. The method of claim 23, wherein the sounding control information identifies the reference channel.

25. The method of claim 23, wherein the sounding control information identifies the wireless channel as a reference channel for future channel reports.

26. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
transmit, over a wireless channel, sounding control information indicating a configuration of the wireless communication device, wherein the sounding control information includes an indication of a number that indicates one or more transmission parameters for one or more sounding packets and timing information associated with the one or more sounding packets;
transmit a sounding packet, over the wireless channel, to a receiving device, the sounding packet including information carried in one or more training fields configured for channel estimation; and
receive a channel report from the receiving device responsive to the transmission of the sounding packet, the channel report including channel state information (CSI) for the wireless channel, and the channel report including the indication of the number that indicates the one or more transmission parameters for the one or more sounding packets and the timing information associated with the one or more sounding packets.

27. The wireless communication device of claim 26, wherein execution of the processor-readable code is further configured to:
   sense objects in a vicinity of the wireless communication device based on the received channel report.

28. The wireless communication device of claim 26, wherein the channel report indicates a difference in CSI between the wireless channel and a reference channel.

29. The wireless communication device of claim 28, wherein the sounding control information identifies the reference channel.

30. The wireless communication device of claim 28, wherein the sounding control information identifies the wireless channel as a reference channel for future channel reports.

* * * * *